United States Patent
Xie et al.

(10) Patent No.: US 11,876,546 B2
(45) Date of Patent: Jan. 16, 2024

(54) AIRBORNE ELECTROMAGNETIC WAVE DEVICE, AND ANTI-INTERFERENCE SYSTEM, METHOD AND APPARATUS

(71) Applicant: CHINA ELECTRONICS TECHNOLOGY AVIONICS CO., LTD., Sichuan (CN)

(72) Inventors: Yongfeng Xie, Sichuan (CN); Fei Wu, Sichuan (CN); Wenjun Ye, Sichuan (CN); Junkang Ma, Sichuan (CN)

(73) Assignee: CHINA ELECTRONICS TECHNOLOGY AVIONICS CO., LTD., Sichuan (CN)

( * ) Notice: Subject to any disclaimer, the term of this patent is extended or adjusted under 35 U.S.C. 154(b) by 0 days.

(21) Appl. No.: 17/785,424

(22) PCT Filed: Dec. 17, 2020

(86) PCT No.: PCT/CN2020/137053
§ 371 (c)(1),
(2) Date: Jun. 15, 2022

(87) PCT Pub. No.: WO2021/129495
PCT Pub. Date: Jul. 1, 2021

(65) Prior Publication Data
US 2023/0024315 A1     Jan. 26, 2023

(30) Foreign Application Priority Data
Dec. 25, 2019  (CN) .......................... 201911360409.3

(51) Int. Cl.
*H04B 1/12*  (2006.01)
(52) U.S. Cl.
CPC ...................................... *H04B 1/12* (2013.01)
(58) Field of Classification Search
CPC ........................................................ H04B 1/12
See application file for complete search history.

(56) References Cited

U.S. PATENT DOCUMENTS

| 10,461,421 B1 | 10/2019 | Tran et al. |
| 2006/0222058 A1 | 10/2006 | Simic et al. |

(Continued)

FOREIGN PATENT DOCUMENTS

| CN | 101103279 A | 1/2008 |
| CN | 103518144 A | 1/2014 |

(Continued)

OTHER PUBLICATIONS

International Search Report for PCT/CN2020/137053 dated Mar. 17, 2021, ISA/CN.

(Continued)

*Primary Examiner* — Junpeng Chen
(74) *Attorney, Agent, or Firm* — Yue (Robert) Xu; Apex Attorneys at Law, LLP (57) ABSTRACT

Disclosed are an airborne electromagnetic wave device, and an anti-interference system, method and apparatus. The anti-interference method comprises: detecting an interference source, and obtaining a working frequency and a bandwidth of the interference source; calculating an interfered bandwidth range at least on the basis of the working frequency and bandwidth of the interference source; and controlling an electrically tunable filter provided in a transmission channel of the airborne electromagnetic wave device to filter signals within the interfered bandwidth range. Hence, the interfered airborne electromagnetic wave device is triggered to control the electrically tunable filter to filter the signals within the interfered bandwidth range, so that the interfered airborne electromagnetic wave device suspends signal transmission within the interfered bandwidth range, so that communication interference among different satellite communication systems is eliminated; moreover, the electrically tunable filter is provided on the transmission channel of the interfered airborne electromag- (Continued)

netic wave device, so that the present invention can be widely applied to multiple different airborne electromagnetic wave devices and has relatively wide applicability.

8 Claims, 3 Drawing Sheets

(56) References Cited

U.S. PATENT DOCUMENTS

| | | |
|---|---|---|
| 2014/0070989 A1 | 3/2014 | Wang |
| 2015/0065058 A1* | 3/2015 | Wang .................... H04B 15/00 455/63.1 |
| 2016/0134325 A1* | 5/2016 | Tageman ............... H04B 1/525 455/83 |
| 2017/0063414 A1* | 3/2017 | Hedayati ................. H04B 1/16 |
| 2017/0346578 A1* | 11/2017 | Sundararajan ....... H04B 17/345 |

FOREIGN PATENT DOCUMENTS

| | | | |
|---|---|---|---|
| CN | 105933014 A | | 9/2016 |
| CN | 106899316 A | | 6/2017 |
| CN | 110266621 A | | 9/2019 |
| CN | 110971251 A | | 4/2020 |
| CN | 211018844 U | | 7/2020 |
| KR | 2003058414 A | * | 7/2003 |

OTHER PUBLICATIONS

The 1st Office Action regarding Chinese Patent Application No. CN201911360409.3, dated May 31, 2023.

* cited by examiner

AIRBORNE ELECTROMAGNETIC WAVE DEVICE, AND ANTI-INTERFERENCE SYSTEM, METHOD AND APPARATUS

This application is the national phase of International Patent Application No. PCT/CN2020/137053, titled "AIRBORNE ELECTROMAGNETIC WAVE DEVICE, AND ANTI-INTERFERENCE SYSTEM, METHOD AND APPARATUS", filed on Dec. 17, 2020, which claims the priority to Chinese Patent Application No. 201911360409.3 titled "AIRBORNE ELECTROMAGNETIC WAVE DEVICE, AND ANTI-INTERFERENCE SYSTEM, METHOD AND APPARATUS", filed on Dec. 25, 2019 with the China National Intellectual Property Administration (CNIPA), both of which are incorporated herein by reference in their entireties.

FIELD

The present disclosure relates to the technical field of communication anti-interference, and in particular to an airborne electromagnetic wave device, an anti-interference system, and a method and an apparatus for resisting interference.

BACKGROUND

With the development of science and technology, satellite communication is widely used in various fields. Especially, the rapid development of aeronautical satellite communication is greatly helpful for safe flight of aircrafts. Operating frequency bands of different aeronautical satellite communication systems may be overlapped with each other, resulting in interference in communication between the aeronautical satellite communication systems. Therefore, anti-interference in satellite communication is an unavoidable problem in the development of aeronautical satellite communication technology.

In current industry applications, a fixed pre-filter is normally arranged in an airborne electromagnetic wave device, to provide a higher operating frequency band for an aeronautical satellite communication system, so as to improve the isolation from interference and avoid the communication interference of other aeronautical satellite communication systems. Different aeronautical satellite communication systems have different production standards, and the conventional technical solutions are limited for not applicable over a wide range of aeronautical satellite communication systems.

SUMMARY

An airborne electromagnetic wave device, an anti-interference system, and a method and an apparatus for resisting interference are provided according to the present disclosure, to solve the problem of communication interference of any one of aeronautical satellite communication systems due to communication service frequencies between the aeronautical satellite communication systems overlapped with each other.

In order to achieve the above objects, the following technical solutions are provided according to the present disclosure.

An anti-interference system includes a first airborne electromagnetic wave device, a second airborne electromagnetic wave device and a controller. The first airborne electromagnetic wave device and the second airborne electromagnetic wave device are connected to the controller. An operating frequency band of the first airborne electromagnetic wave device is overlapped with an operating frequency band of the second airborne electromagnetic wave device. A transmission channel of an interfered airborne electromagnetic wave device is provided with an electrically tunable filter. The controller is configured to: calculate, in a case that an interfering airborne electromagnetic wave device is powered-on, an interfered band based on an operating frequency and a bandwidth of the interfering airborne electromagnetic wave device; and trigger an operation that the interfered airborne electromagnetic wave device controls the electrically tunable filter to filter out signals within the interfered band. The interfered airborne electromagnetic wave device is the first airborne electromagnetic wave device, and the interfering airborne electromagnetic wave device is the second airborne electromagnetic wave device; or the interfered airborne electromagnetic wave device is the second airborne electromagnetic wave device, and the interfering airborne electromagnetic wave device is the first airborne electromagnetic wave device.

In an embodiment, the controller to calculate an interfered band based on an operating frequency and a bandwidth of the interfering airborne electromagnetic wave device includes: the controller being configured to: determine a sum of the operating frequency and a first bandwidth as an upper limit, and determine a difference between the operating frequency and the first bandwidth as a lower limit, to acquire the interfered band. The first bandwidth is a sum of the bandwidth and a preset transition protection bandwidth.

In an embodiment, the controller to trigger an operation that the interfered airborne electromagnetic wave device controls the electrically tunable filter to filter out signals within the interfered band includes: the controller being configured to transmit a control command to the interfered airborne electromagnetic wave device, where the control command includes the interfered band; where the interfered airborne electromagnetic wave device is configured to control, based on the control command, the electrically tunable filter to increase attenuation of the signals within the interfered band by a preset value.

In an embodiment, the electrically tunable filter includes a band stop filter, and the interfered airborne electromagnetic wave device to control, based on the control command, the electrically tunable filter to increase attenuation of the signals within the interfered band by a preset value includes: the interfered airborne electromagnetic wave device being configured to: control, through a DAC output voltage, a frequency of the band stop filter to be the operating frequency, and an operating bandwidth of the band stop filter to be the interfered band.

In an embodiment, the electrically tunable filter includes a band-pass filter, and the interfered airborne electromagnetic wave device to control, based on the control command, the electrically tunable filter to increase attenuation of the signals within the interfered band by a preset value includes the interfered airborne electromagnetic wave device being configured to: control, through a DAC output voltage, the band-pass filter to operate outside the interfered band.

In an embodiment, the transmission channel of an interfered airborne electromagnetic wave device being provided with an electrically tunable filter includes: at least one of a receiving channel and a transmitting channel of the interfered airborne electromagnetic wave device being provided with the electrically tunable filter.

A method for resisting interference includes: detecting an interference source, and acquiring an operating frequency and a bandwidth of the interference source; calculating an interfered band at least based on the operating frequency and the bandwidth of the interference source; and controlling an electrically tunable filter arranged in a transmission channel of an airborne electromagnetic wave device to filter out signals within the interfered band.

An apparatus for resisting interference, applicable in an airborne electromagnetic wave device, includes: a detection module, configured to detect an interference source and acquire an operating frequency and a bandwidth of the interference source; a calculation module, configured to calculate an interfered band at least based on the operating frequency and the bandwidth of the interference source; and a baseband processing module, configured to control an electrically tunable filter arranged on at least one of a receiving channel and a transmitting channel to filter out signals within the interfered band.

An airborne electromagnetic wave device includes a baseband processor and an electrically tunable filter connected to the baseband processor. The electrically tunable filter is arranged on a transmission channel of the airborne electromagnetic wave device. The baseband processor is configured to control, in response to receiving an interfered band, the electrically tunable filter to increase attenuation of signals within the interfered band by a preset value.

In an embodiment, the airborne electromagnetic wave device includes an airborne Beidou device. A transmission channel of the airborne Beidou device includes a transmitting channel and a receiving channel. The transmitting channel includes an amplifier and a fixed filter. The receiving channel includes the amplifier and the fixed filter.

In accordance with the airborne electromagnetic wave device, the anti-interference system, and the method and apparatus for resisting interference according to the present disclosure, the anti-interference system includes a first airborne electromagnetic wave device, a second airborne electromagnetic wave device and a controller. An operating frequency band of the first airborne electromagnetic wave device is overlapped with an operating frequency band of the second airborne electromagnetic wave device, a transmission channel of an interfered airborne electromagnetic wave device is provided with an electrically tunable filter, and the controller is configured to: calculate, in a case that an interfering airborne electromagnetic wave device is powered-on, an interfered band based on an operating frequency and a bandwidth of the interfering airborne electromagnetic wave device; and trigger an operation that the interfered airborne electromagnetic wave device controls the electrically tunable filter to filter out signals within the interfered band. It can be seen that the interfered airborne electromagnetic wave device controls the electrically tunable filter to filter out the signals within the interfered band, and therefore the interfered airborne electromagnetic wave device can stop signal transmission within the interfered band, so as to eliminate interference in communication between different satellite communication systems. Moreover, the scheme of providing the electrically tunable filter on the transmission channel of the interfered airborne electromagnetic wave device can be widely applied to various airborne electromagnetic wave devices and has wide applicability.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION

The technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

Figure 1:
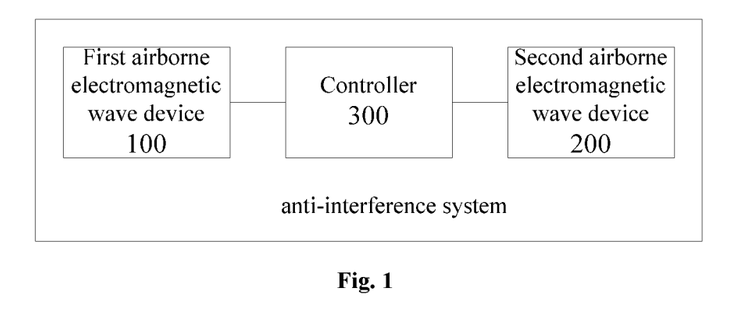
FIG. 1 is a schematic diagram showing a framework of an anti-interference system according to an embodiment of the present disclosure.

Reference is made to FIG. 1, which is a schematic diagram showing a framework of an anti-interference system according to an embodiment of the present disclosure. The anti-interference system includes a first airborne electromagnetic wave device 100, a second airborne electromagnetic wave device 200 and a controller 300. The first airborne electromagnetic wave device 100 and the second airborne electromagnetic wave device 200 are each connected to the controller 300.

It should be noted that the first airborne electromagnetic wave device 100 and the second airborne electromagnetic wave device 200 are devices for providing satellite communication services. Moreover, a type of the first airborne electromagnetic wave device 100 and a type of the second airborne electromagnetic wave device 200 may be determined by technicians according to the practical application.

An operating frequency band of the first airborne electromagnetic wave device 100 is overlapped with an operating frequency band of the second airborne electromagnetic wave device 200. A transmission channel of an interfered airborne electromagnetic wave device is provided with an electrically tunable filter.

It should be noted that the interfered airborne electromagnetic wave device may be the first airborne electromagnetic wave device 100, and an interfering airborne electromagnetic wave device may be the second airborne electromagnetic wave device 200. Alternatively, the interfered airborne electromagnetic wave device may be the second airborne electromagnetic wave device 200, and the interfering airborne electromagnetic wave device may be the first airborne electromagnetic wave device 100.

In other words, the first airborne electromagnetic wave device 100 and the second airborne electromagnetic wave device 200 form a pair of interfered airborne electromagnetic wave device and interfering airborne electromagnetic wave device.

In a case that the interfering airborne electromagnetic wave device is powered-on, the controller 300 calculates an interfered band based on an operating frequency and a bandwidth of the interfering airborne electromagnetic wave device, and triggers an operation that the interfered airborne electromagnetic wave device controls the electrically tunable filter to filter out signals within the interfered band.

In an embodiment of the present disclosure, the process of the controller 300 calculating the interfered band based on the operating frequency and the bandwidth of the interfering airborne electromagnetic wave device includes: determining a sum of the operating frequency f of the interfering airborne electromagnetic wave device and a first bandwidth $B_3$ as an upper limit, and determining a difference between the operating frequency f of the interfering airborne electromagnetic wave device and the first bandwidth $B_3$ as a lower limit, to acquire the interfered band $(f-B_3, f+B_3)$.

The first bandwidth $B_3$ is a sum of the bandwidth $B_1$ of the interfering airborne electromagnetic wave device and a preset transition protection bandwidth $B_2$, that is, $B_3=B_1+B_2$.

It should be noted that the transition protection bandwidth $B_2$ may be determined by technicians according to the practical application.

Figure 2:
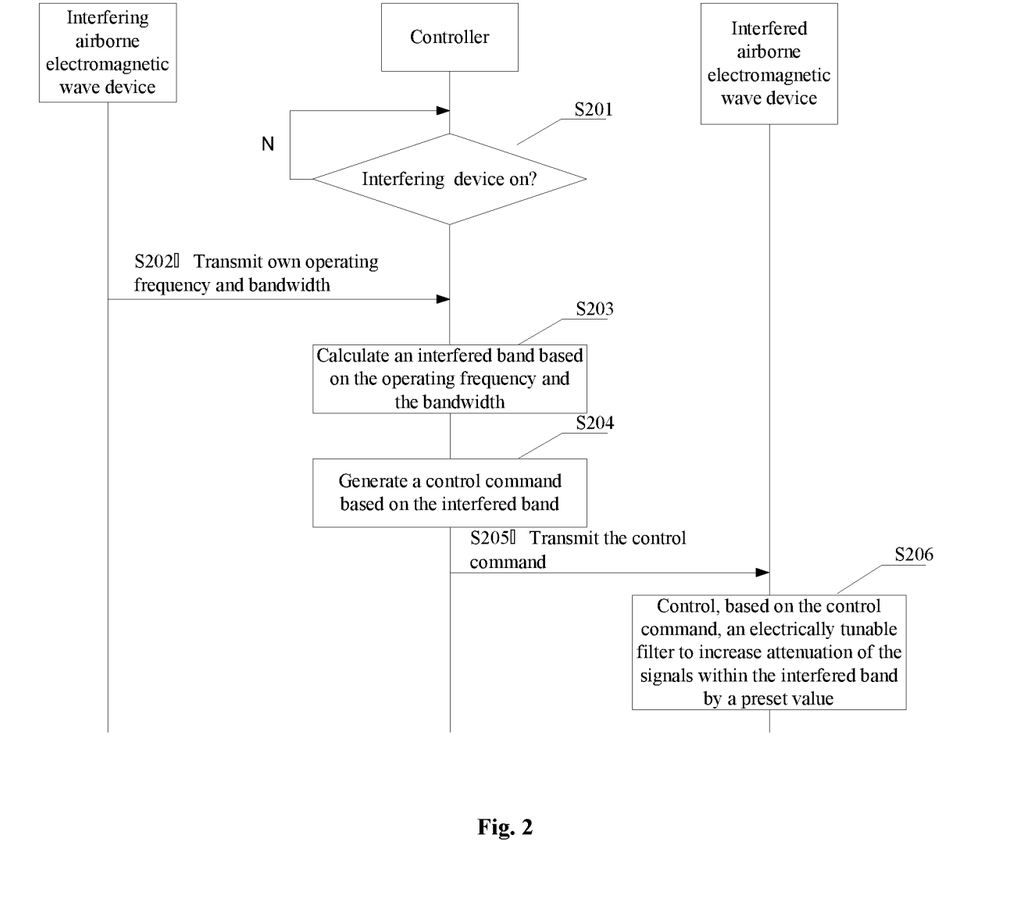
FIG. 2 is a schematic diagram showing a process in which a controller controls an interfered airborne electromagnetic wave device to resist interference according to an embodiment of the present disclosure.

In an embodiment of the present disclosure, a process of a controller controlling the interfered airborne electromagnetic wave device to resist interference includes the following steps S201 to S206, as shown in FIG. 2.

In step S201, the controller detects whether the interfering airborne electromagnetic wave device is powered-on. If the interfering airborne electromagnetic wave device is powered-on, step S202 is performed. If the interfering airborne electromagnetic wave device is not powered-on, step S201 is performed at a preset periodicity.

In step S202, the controller acquires an operating frequency and a bandwidth of interfering airborne electromagnetic wave device.

The operating frequency and the bandwidth of the interfering airborne electromagnetic wave device may be pre-stored in a preset storage medium (such as a memory of the controller).

In step S203, the controller calculates the interfered band based on the operating frequency and the bandwidth.

In step S204, the controller generates a control command based on the interfered band.

In step S205, the controller transmits the control command to the interfered airborne electromagnetic wave device.

The control command includes the interfered band. The interfered airborne electromagnetic wave device refers to the first airborne electromagnetic wave device or the second airborne electromagnetic wave device.

In step S206, the interfered airborne electromagnetic wave device controls, based on the control command, the electrically tunable filter to increase attenuation of the signals within the interfered band by a preset value.

The process of controlling the electrically tunable filter to increase attenuation of the signals within the interfered band by a preset value is known in the art. For example, the attenuation of the signals within the interfered band is increased by 50 dB through controlling an output voltage of the electrically tunable filter by a digital-to-analog converter (DAC). In addition, the preset value may be determined by technicians according to the practical application, which is not described in details herein.

It should be noted that in the embodiment of the present disclosure, the electrically tunable filter includes but is not limited to a band stop filter, a band-pass filter and other filters.

In an embodiment, in a case of using a band stop filter as the electrically tunable filter, the process of the interfered airborne electromagnetic wave device controlling the electrically tunable filter based on the control command to increase the attenuation of the signals within the interfered band by the preset value includes: controlling, by the interfered airborne electromagnetic wave device, a frequency of the band stop filter as the operating frequency, and an operating bandwidth of the band stop filter as the interfered band through a DAC output voltage.

It should be noted that the process of controlling the frequency of the band stop filter as the operating frequency, and the operating bandwidth of the band stop filter as the interfered band through the DAC output voltage, to increase the attenuation of the signals within the interfered band by the preset value is known in the art, which is not described in details herein.

In an embodiment, in a case of using a band-pass filter as the electrically tunable filter, the process of the interfered airborne electromagnetic wave device controlling the electrically tunable filter based on the control command to increase the attenuation of the signals within the interfered band by the preset value includes: controlling, by the interfered airborne electromagnetic wave device, the band-pass filter to operate outside the interfered band through the DAC output voltage.

It should be noted that the process of controlling the band-pass filter to operate outside the interfered band through the DAC output voltage to increase the attenuation of the signals within the interfered band by the preset value is known in the art, which is not described in details herein.

It should be noted that in the embodiment of the present disclosure, the transmission channel of the interfered airborne electromagnetic wave device includes a receiving channel and a transmitting channel.

In an embodiment, the receiving channel or the transmitting channel of the interfered airborne electromagnetic wave device may be provided with an electrically tunable filter. Alternatively, both the receiving channel and the transmitting channel of the interfered airborne electromagnetic wave device are provided with electrically adjustable filters.

In an embodiment of the present disclosure, a first airborne electromagnetic wave device and a second airborne electromagnetic wave device form a pair of interfered airborne electromagnetic wave device and interfering airborne electromagnetic wave device, an operating frequency band of the first airborne electromagnetic wave device is overlapped with an operating frequency band of the second airborne electromagnetic wave device, and a transmission channel of an interfered airborne electromagnetic wave device is provided with an electrically tunable filter. In a case that the interfering airborne electromagnetic wave device is powered-on, an interfered band is calculated based on an operating frequency and a bandwidth of the interfering airborne electromagnetic wave device, and an operation that the interfered airborne electromagnetic wave device controls the electrically tunable filter to filter out signals within the interfered band is triggered. It can be seen that the interfered airborne electromagnetic wave device controls the electrically tunable filter to filter out the signals within the interfered band, and therefore the interfered airborne electromagnetic wave device can stop signal transmission within the interfered band, so as to eliminate interference in communication between different satellite communication systems. Moreover, the scheme of providing the electrically tunable filter on the transmission channel of the interfered airborne electromagnetic wave device can be widely applied to various airborne electromagnetic wave devices, and has wide applicability.

Figure 3:
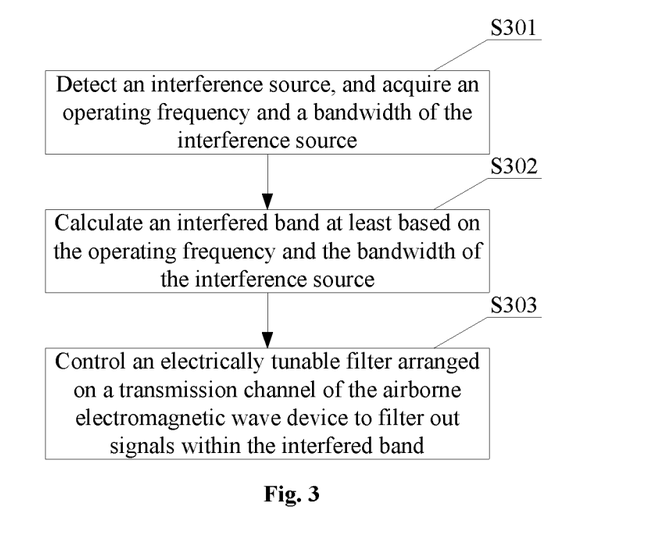
FIG. 3 is a schematic diagram of a method for resisting interference according to an embodiment of the present disclosure.

Corresponding to the anti-interference system according to the embodiment of the present disclosure described above, a method for resisting interference is further provided according to an embodiment of the present disclosure. As shown in FIG. 3, the method for resisting interference includes the following steps S301 to S303.

In step S301, an interference source is detected, and an operating frequency and a bandwidth of the interference source are acquired.

Satellite communication systems may encounter communication interference if airborne electromagnetic wave devices in the systems have operating frequency bands overlapped with each other. In the embodiment of the present disclosure, an airborne electromagnetic wave device that causes interference to another airborne electromagnetic wave device is regarded as an interference source, and the airborne electromagnetic wave device that undergoes interference is regarded as an interfered source. The interference source may be detected by detecting whether the interfering airborne electromagnetic wave device is powered-on. The interference source may be detected in other conventional ways.

In addition, the process of acquiring the operating frequency and the bandwidth of the interference source (that is, the airborne electromagnetic wave device) is known in the art, which is not described in details herein.

In step S302, an interfered band is calculated at least based on the operating frequency and the bandwidth of the interference source.

The process and principle of the step S302 are the same as the process and the principle of the controller calculating the interfered band based on the operating frequency and the bandwidth of the interfering airborne electromagnetic wave device described above, which are not repeated herein.

In step S303, an electrically tunable filter arranged in a transmission channel of an airborne electromagnetic wave device is controlled to filter out signals within the interfered band.

The process and principle of the step S303 are the same as the process and the principle of the controller triggering the case that the interfered airborne electromagnetic wave device controls the electrically tunable filter to filter out signals within the interfered band shown in FIG. 2, which are not repeated herein.

In the embodiment of the present disclosure, an interference source is detected, an operating frequency and a bandwidth of the interference source are acquired, an interfered band is calculated at least based on the operating frequency and the bandwidth of the interference source, and the electrically tunable filter arranged on the transmission channel of the airborne electromagnetic wave device is controlled to filter out signals within the interfered band. It can be seen that the interfered airborne electromagnetic wave device controls the electrically tunable filter to filter out the signals within the interfered band, and therefore the interfered airborne electromagnetic wave device can stop signal transmission within the interfered band, so as to eliminate interference in communication between different satellite communication systems. Moreover, the scheme of providing the electrically tunable filter on the transmission channel of the interfered airborne electromagnetic wave device can be widely applied to various airborne electromagnetic wave devices and has wide applicability.

Figure 4:
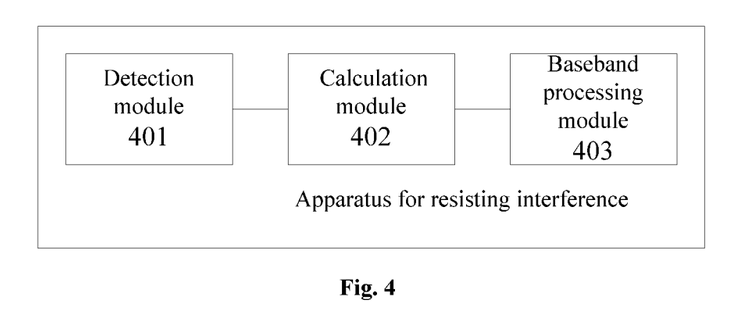
FIG. 4 is a schematic structural diagram of a device for resisting interference according to an embodiment of the present disclosure.

In an embodiment, based on the method for resisting interference according to the embodiment of the present disclosure described above, a device for resisting interference is further provided according to an embodiment of the present disclosure, which is applicable in an airborne electromagnetic wave device. As shown in FIG. 4, the device for resisting interference includes a detection module 401, a calculation module 402 and a baseband processing module 403.

The detection module 401 is configured to detect an interference source and acquire an operating frequency and a bandwidth of the interference source.

The process and the principle for the detection module 401 to detect an interference source and acquire an operating frequency and a bandwidth of the interference source are the same as the process and the principle of the step S301 shown in FIG. 3, which are not repeated herein.

The calculation module 402 is configured to calculate an interfered band at least based on the operating frequency and the bandwidth of the interference source.

The process and the principle for the calculation module 402 to calculate an interfered band at least based on the operating frequency and the bandwidth of the interference source are the same as the process and the principle of the step S302 shown in FIG. 3, which are not repeated herein.

The baseband processing module 403 is configured to control an electrically tunable filter arranged on at least one of a receiving channel and a transmitting channel to filter out signals within the interfered band.

The process and the principle of the baseband processing module 403 controlling the electrically tunable filter arranged on the transmission channel of the airborne electromagnetic wave device to filter out signals within the interfered band are the same as the process and the principle of the step S303 shown in FIG. 3, which are not repeated herein.

In the embodiment of the present disclosure, an interference source is detected, an operating frequency and a bandwidth of the interference source are acquired, an interfered band is calculated at least based on the operating frequency and the bandwidth of the interference source, and the electrically tunable filter arranged on the transmission channel of the airborne electromagnetic wave device is controlled to filter out signals within the interfered band. It can be seen that the interfered airborne electromagnetic wave device controls the electrically tunable filter to filter out the signals within the interfered band, and therefore the interfered airborne electromagnetic wave device can stop signal transmission within the interfered band, so as to eliminate interference in communication between different satellite communication systems. Moreover, the scheme of providing the electrically tunable filter on the transmission channel of the interfered airborne electromagnetic wave device can be widely applied to various airborne electromagnetic wave devices and has wide applicability.

Figure 5:
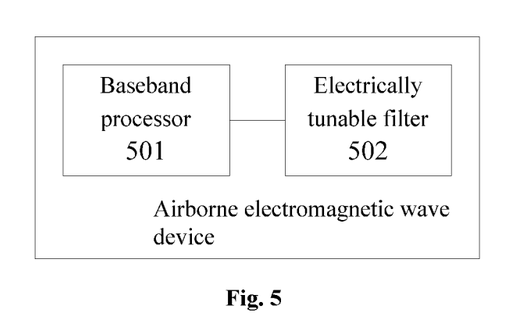
FIG. 5 is a schematic structural diagram of an airborne electromagnetic wave device according to an embodiment of the present disclosure.

In an embodiment, reference is made to FIG. 5, which is a schematic structural diagram of an airborne electromagnetic wave device according to an embodiment of the present disclosure. The airborne electromagnetic wave device includes a baseband processor 501 and an electrically tunable filter 502.

The electrically tunable filter 502 is connected to the baseband processor 501. The electrically tunable filter 502 is arranged on a transmission channel of the airborne electromagnetic wave device.

In response to receiving information of the interfered band, the baseband processor 501 controls the electrically tunable filter 502 to increase attenuation of signals within the interfered band by a preset value.

The process and the principle for the baseband processor 501 to control the electrically tunable filter 502 to increase attenuation of signals within the interfered band by a preset value are the same as the process and the principle of the steps S301 to S303 shown in FIG. 3, which are not repeated herein.

Figure 6:
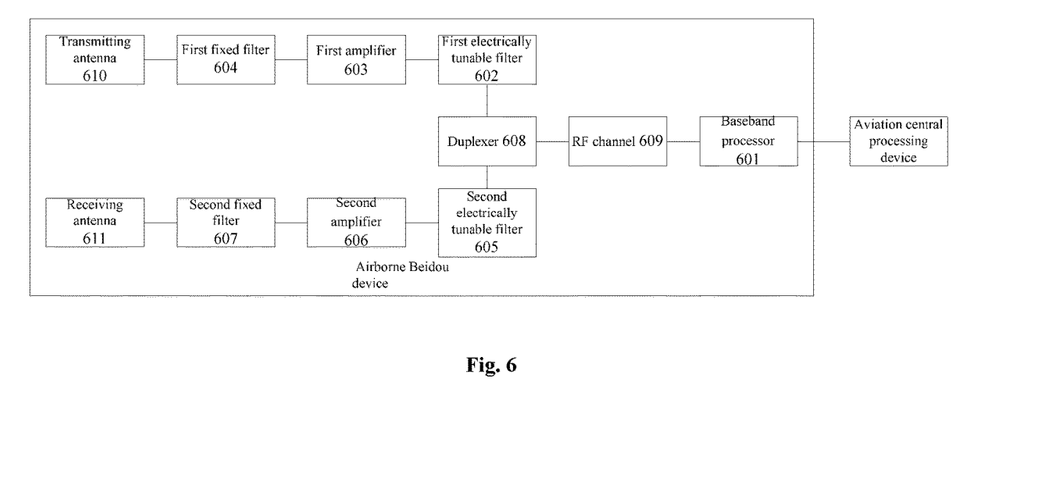
FIG. 6 is a schematic structural diagram of an airborne Beidou Navigation Satellite device according to an embodiment of the present disclosure.

In addition, to further understand the structure of the airborne electromagnetic wave device, exemplary explanation is made in connection with a Beidou device. FIG. 6 is a schematic structural diagram of an airborne Beidou device according to an embodiment of the present disclosure. The airborne Beidou device includes a baseband processor 601, a first electrically tunable filter 602, a first amplifier 603, a first fixed filter 604, a second electrically tunable filter 605, a second amplifier 606, a second fixed filter 607, a duplexer 608, a RF channel 609, a transmitting antenna 610 and a receiving antenna 611.

The first electrically adjustable filter 602, the first amplifier 603 and the first fixed filter 604 are arranged on a transmitting channel of the airborne Beidou device.

The second electrically adjustable filter 605, the second amplifier 606 and the second fixed filter 607 are arranged on a receiving channel of the airborne Beidou device.

The baseband processor 601 is connected to an end of the RF channel 609, and another end of the RF channel 609 is connected to a first end of the duplexer 608.

A second end of the duplexer 608 is connected to an end of the first electrically tunable filter 602, another end of the first electrically tunable filter 602 is connected to an end of the first amplifier 603, another end of the first amplifier 603 is connected to an end of the first fixed filter 604, and another end of the first fixed filter 604 is connected to the transmitting antenna 610.

A third end of the duplexer 608 is connected to an end of the second electrically tunable filter 605, another end of the second electrically tunable filter 605 is connected to an end of the second amplifier 606, another end of the second amplifier 606 is connected to an end of the second fixed filter 607, and another end of the second fixed filter 607 is connected to the receiving antenna 611.

It should be noted that as either an interfering airborne electromagnetic wave device or an interfered airborne electromagnetic wave device in the anti-interference system, the airborne Beidou device communicates with and connects to the controller in the anti-interference system through the baseband processor 601. In addition, in the embodiment of the present disclosure, an aviation central processing device (such as IMA) serves as the controller.

In the embodiment of the present disclosure, in response to receiving information about an interfered band, the baseband processor controls the electrically tunable filter to increase attenuation of the signals within the interfered band by the preset value. It can be seen that the interfered airborne electromagnetic wave device controls the electrically tunable filter to filter out the signals within the interfered band, and therefore the interfered airborne electromagnetic wave device can stop signal transmission within the interfered band, so as to eliminate interference in communication between different satellite communication systems. Moreover, the scheme of providing the electrically tunable filter on the transmission channel of the interfered airborne electromagnetic wave device can be widely applied to various airborne electromagnetic wave devices and has wide applicability.

The embodiments in this specification are described in a progressive way, each of which emphasizes the differences from others, and the same or similar parts among the embodiments can be referred to each other.

Based on the above description of the disclosed embodiments, those skilled in the art can implement or carry out the present disclosure. It is apparent for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. An anti-interference system comprising a first airborne electromagnetic wave device, a second airborne electromagnetic wave device and a controller, wherein
the first airborne electromagnetic wave device and the second airborne electromagnetic wave device are each connected to the controller;
an operating frequency band of the first airborne electromagnetic wave device is overlapped with an operating frequency band of the second airborne electromagnetic wave device;
a transmission channel of an interfered airborne electromagnetic wave device is provided with an electrically tunable filter;
the controller is configured to:
calculate, in a case that an interfering airborne electromagnetic wave device is powered-on, an interfered band based on an operating frequency and a bandwidth of the interfering airborne electromagnetic wave device; and trigger an operation that the interfered airborne electromagnetic wave device controls the electrically tunable filter to filter out signals within the interfered band, wherein
the interfered airborne electromagnetic wave device is the first airborne electromagnetic wave device, and the interfering airborne electromagnetic wave device is the second airborne electromagnetic wave device; or
the interfered airborne electromagnetic wave device is the second airborne electromagnetic wave device, and the interfering airborne electromagnetic wave device is the first airborne electromagnetic wave device;
wherein the controller calculating the interfered band based on the operating frequency and the bandwidth of the interfering airborne electromagnetic wave device comprises:
determining a sum of the operating frequency and a first bandwidth as an upper limit, and determining a difference between the operating frequency and the first bandwidth as a lower limit, to acquire the interfered band, wherein the first bandwidth is a sum of the bandwidth and a preset transition protection bandwidth.

2. The system according to claim 1, wherein the controller triggering the operation that the interfered airborne electromagnetic wave device controls the electrically tunable filter to filter out the signals within the interfered band comprises:

transmitting a control command to the interfered airborne electromagnetic wave device, wherein the control command comprises the interfered band; wherein
the interfered airborne electromagnetic wave device is configured to control, based on the control command, the electrically tunable filter to increase attenuation of the signals within the interfered band by a preset value.

3. The system according to claim 2, wherein
the electrically tunable filter comprises a band stop filter, and
the interfered airborne electromagnetic wave device controlling, based on the control command, the electrically tunable filter to increase attenuation of the signals within the interfered band by a preset value, comprises:
controlling, through a DAC output voltage, a frequency of the band stop filter to be the operating frequency, and an operating bandwidth of the band stop filter to be the interfered band.

4. The system according to claim 2, wherein
the electrically tunable filter comprises a band-pass filter, and
the interfered airborne electromagnetic wave device controlling, based on the control command, the electrically tunable filter to increase attenuation of the signals within the interfered band by the preset value comprises:
controlling, through a DAC output voltage, the band-pass filter to operate outside the interfered band.

5. The system according to claim 1, wherein providing the transmission channel of an interfered airborne electromagnetic wave device with the electrically tunable filter comprises:
providing at least one of a receiving channel and a transmitting channel of the interfered airborne electromagnetic wave device with the electrically tunable filter.

6. A method for resisting interference, comprising:
detecting an interference source, and acquiring an operating frequency and a bandwidth of the interference source;
calculating an interfered band at least based on the operating frequency and the bandwidth of the interference source, comprising determining a sum of the operating frequency and a first bandwidth as an upper limit, and determining a difference between the operating frequency and the first bandwidth as a lower limit, to acquire the interfered band, wherein the first bandwidth is a sum of the bandwidth and a preset transition protection bandwidth; and
controlling an electrically tunable filter arranged in a transmission channel of an airborne electromagnetic wave device to filter out signals within the interfered band.

7. An airborne electromagnetic wave device comprising a baseband processor and an electrically tunable filter connected to the baseband processor, wherein
the electrically tunable filter is arranged on a transmission channel of the airborne electromagnetic wave device; and
the baseband processor is configured to control, in response to receiving an interfered band, the electrically tunable filter to increase attenuation of signals within the interfered band by a preset value, wherein the interfered band is calculated by determining a sum of an operating frequency of an interference source and a first bandwidth as an upper limit, and determining a difference between the operating frequency and the first bandwidth as a lower limit, to acquire the interfered band, wherein the first bandwidth is a sum of a bandwidth of the interference source and a preset transition protection bandwidth.

8. The airborne electromagnetic wave device according to claim 7, wherein the airborne electromagnetic wave device comprises an airborne Beidou device, wherein
a transmission channel of the airborne Beidou device comprises a transmitting channel and a receiving channel;
the transmitting channel comprises an amplifier and a fixed filter; and
the receiving channel comprises the amplifier and the fixed filter.

* * * * *